United States Patent
Hayashi

Patent Number: 5,495,518
Date of Patent: Feb. 27, 1996

[54] CAR TELEPHONE APPARATUS HAVING OPERATIONAL CONTROL PROGRAM REPLACING FUNCTION

[75] Inventor: Takehiko Hayashi, Yokohama, Japan

[73] Assignee: Matsushita Electric Industrial Co., Ltd., Kadoma, Japan

[21] Appl. No.: 284,294

[22] Filed: Aug. 3, 1994

Related U.S. Application Data

[63] Continuation of Ser. No. 991,543, Dec. 15, 1992, abandoned.

[30] Foreign Application Priority Data

Dec. 16, 1991 [JP] Japan .................... 3-331665

[51] Int. Cl.⁶ .................................... H04Q 7/32
[52] U.S. Cl. .................. 379/58; 340/825.44; 341/106; 365/185.01; 379/59; 455/111; 455/89
[58] Field of Search ................ 379/56, 58, 61, 379/424, 59; 455/11.1, 89, 186; 370/50, 109; 340/825.44; 341/106; 365/185

[56] References Cited

U.S. PATENT DOCUMENTS

| | | | |
|---|---|---|---|
| 4,525,865 | 6/1985 | Mears | 455/186 |
| 4,811,377 | 3/1989 | Krolopp et al. | 379/62 |
| 4,888,734 | 12/1989 | Lee et al. | 365/185 |
| 5,029,233 | 7/1991 | Metroka | 455/11 |
| 5,046,082 | 9/1991 | Zicker et al. | 379/59 |
| 5,060,295 | 10/1991 | Borras et al. | 455/186 |
| 5,086,513 | 2/1992 | Lawrence et al. | 455/186 |
| 5,155,860 | 10/1992 | McClure | 455/89 |
| 5,175,875 | 12/1992 | Yokoya et al. | 455/89 |
| 5,177,478 | 1/1993 | Wagai et al. | 340/825.44 |
| 5,243,342 | 9/1993 | Kattemalalavadi et al. | 341/106 |
| 5,249,302 | 9/1993 | Metroka et al. | 455/11.1 |
| 5,259,018 | 11/1993 | Grimmett et al. | 379/58 |
| 5,353,328 | 10/1994 | Jokimies | 379/58 |
| 5,414,751 | 5/1995 | Yamada | 379/58 |

FOREIGN PATENT DOCUMENTS

| | | |
|---|---|---|
| 0459488A2 | 5/1991 | European Pat. Off. . |
| 0468790A2 | 7/1991 | European Pat. Off. . |
| 62-18189 | 1/1987 | Japan . |
| 63-94323 | 4/1988 | Japan . |

OTHER PUBLICATIONS

Mazda, "Electronics Engineer's Reference Book", 5th Edition pp. 32/17-18. 1983.
Protopapas, "Microcomputer Hardware Design" pp. 213-215 1988.

Primary Examiner—Curtis Kuntz
Assistant Examiner—William Cumming
Attorney, Agent, or Firm—Popham, Haik, Schnobrich & Kaufman, Ltd.

[57] ABSTRACT

The present invention provides an excellent car telephone apparatus which can erase the contents of a memory without dismounting the memory from the car telephone apparatus, i.e., with the memory being mounted in the apparatus, and which also can rewrite the contents of the memory by externally transferring modification data. The car telephone apparatus comprises an electrically erasable and rewritable, nonvolatile memory chip, a control means for controlling the erasing/rewriting operation of the memory chip, a means for transferring and collating external writing data, and a means for externally commanding a series of these control operations.

4 Claims, 4 Drawing Sheets

CAR TELEPHONE APPARATUS HAVING OPERATIONAL CONTROL PROGRAM REPLACING FUNCTION

This application is a File Wrapper Continuation of U.S. patent application Ser. No. 07/991,543, filed Dec. 15, 1992, now abandoned.

BACKGROUND OF THE INVENTION

The present invention relates to a car telephone apparatus.

A prior art car telephone apparatus generally uses an erasable programmable read only memory (EPROM) of an ultraviolet ray type as a nonvolatile memory means for storing software for control of the apparatus.

Accordingly, when it is desired to change the contents of the software already written in the EPROM, it has been necessary to once erase the contents of the EPROM and then to rewrite data contents with use of a special writing means. In addition, the erasing operation of the written contents requires ultraviolet rays to be irradiated onto the EPROM itself, which may adversely affects other parts located in the vicinity of the EPROM. For the purpose of avoiding the influences of the ultraviolet rays on the other parts and improving its workability, it become necessary to once dismount the EPROM from the car telephone apparatus. For easy detachable mounting of the EPROM, it is common practice to mount the EPROM chip per se to a socket.

FIG. 4 schematically shows a block diagram of a control system of a prior art car telephone apparatus. In the drawing, the illustrated control system includes a CPU 21 for controlling the car telephone apparatus, an EPROM 22 as a nonvolatile memory for storing therein software describing a series of control procedures or means, a RAM 23 as a memory for temporarily storing therein arithmetic operation and data for control execution, an I/O port 24 for direct control of peripheral devices within the car telephone apparatus, and a socket 25 for mounting of the EPROM 22 thereto. Various sorts of control of the car telephone apparatus is sequentially carried out under control of the CPU 21 according to the contents of the EPROM 22.

SUMMARY OF THE INVENTION

The above prior art car telephone apparatus, however, has had such a problem that, when it is desired to change the software or control means of the CPU, it is necessary to once disconnect from the car telephone apparatus the EPROM in the form of a memory IC having the program of the software stored therein, to erase the contents of the program by irradiating ultraviolet rays on the disconnected EPROM, to rewrite a modified-software program in the EPROM with use of a special writing means, and then to again mount the EPROM to the socket in the car telephone apparatus, whereby the change of the control means requires a lot of time.

It is an object of the present invention to provide an excellent car telephone apparatus which can solve the above problem in the prior art, which can erase the contents of a program in a memory IC and can rewrite the old program contents into new program contents by transferring the modified data externally to the memory IC, while eliminating the need for disconnecting the memory IC from the car telephone apparatus.

In accordance with an aspect of the present invention, the above object is attained by providing a car telephone apparatus which comprises an electrically erasable and rewritable, nonvolatile memory, control means for controlling the erasing/rewriting operation of the memory, means for transferring and collating externally-entered writing data, and operating means for externally commanding a series of these control operations.

With the aforementioned arrangement of the present invention, the contents of the memory already written therein is erased, externally-entered rewriting data is transferred and temporarily stored, rewriting control for the rewriting of the memory is carried out, and then the temporarily stored data is read out for collation of the rewriting data. As a result, when it is desired to change the program contents, the rewriting of the memory can be advantageously realized without dismounting the memory from the car telephone apparatus.

DESCRIPTION OF THE PREFERRED EMBODIMENT

Figure 1:
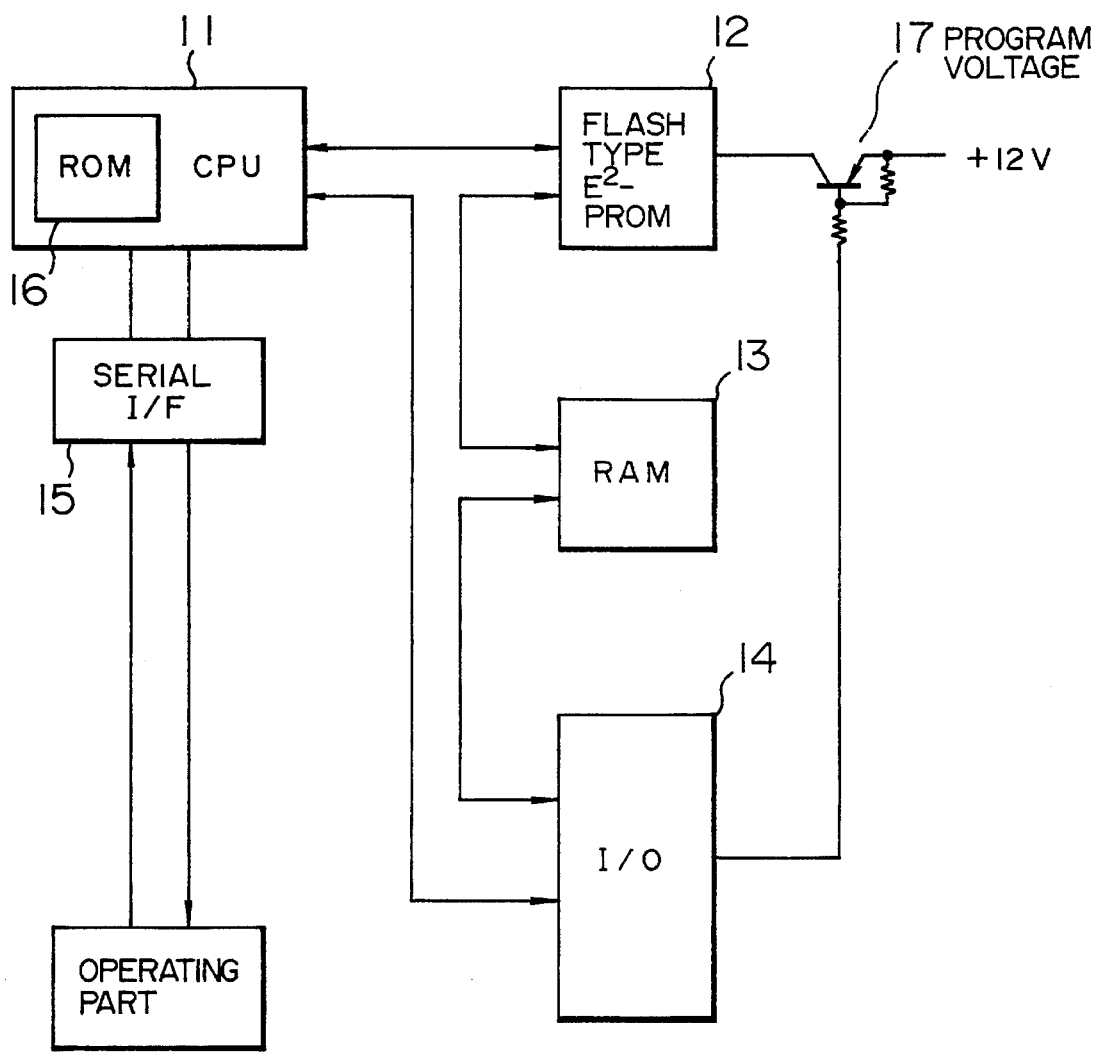
FIG. 1 is a schematic block diagram of a control system of a car telephone apparatus in accordance with an embodiment of the present invention.

Referring to FIG. 1, there is shown an arrangement of a car telephone apparatus in accordance with an embodiment of the present invention.

In FIG. 1, the illustrated apparatus includes a CPU 11, a nonvolatile memory 12 of an electrically erasable type, a RAM 13, an I/O port 14, an asynchronous serial interface 15, a mask ROM 16 incorporated in the CPU 11, and a switching transistor 17 for applying a high voltage to the nonvolatile memory 12 at the time of a write mode. As the electrically erasable nonvolatile memory 12, a flash type electrically erasable and programmable ROM (EEPROM) is used instead of a conventional EPROM, which embodiment will be explained below.

In the case of the flash type EEPROM, when a voltage of about 12 V is externally applied to the EEPROM and a predetermined erase command is input to the EEPROM, the written contents of the EEPROM can be collectively erased electrically instantaneously. Thereafter, when the EEPROM is subjected to a predetermined writing control, the memory contents of the EEPROM can be rewritten.

Figure 2:
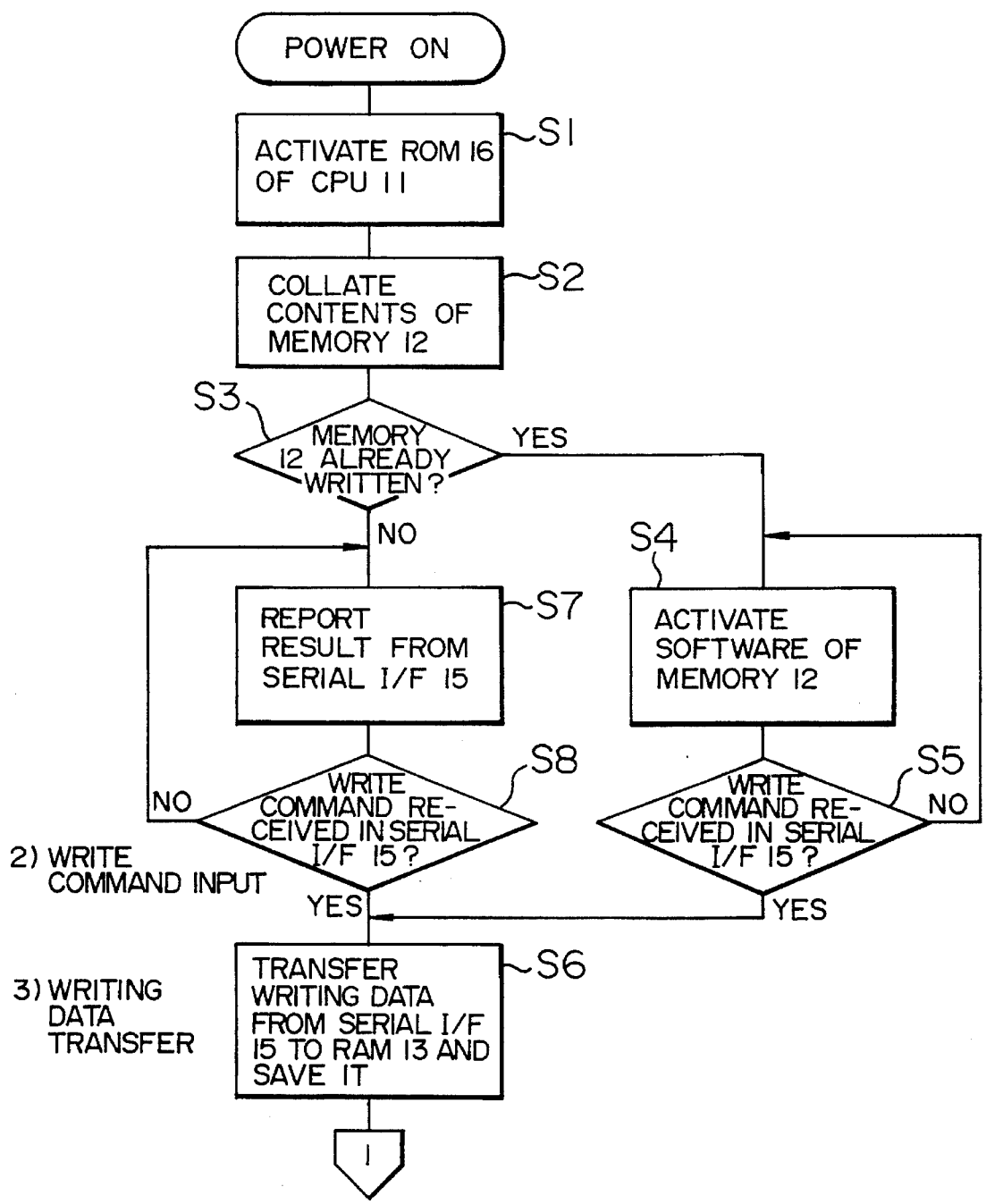
FIGS. 2 and 3 is a flowchart for explaining the writing operation of a nonvolatile memory 12.
Figure 3:
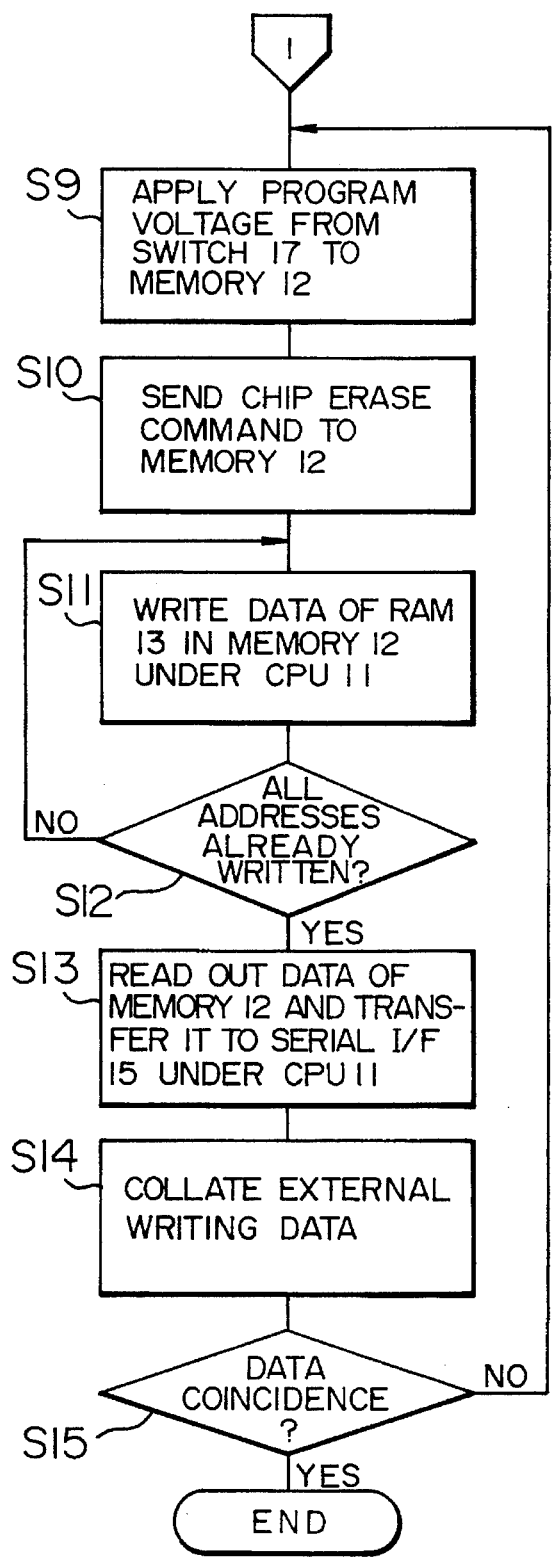
Figure 4:
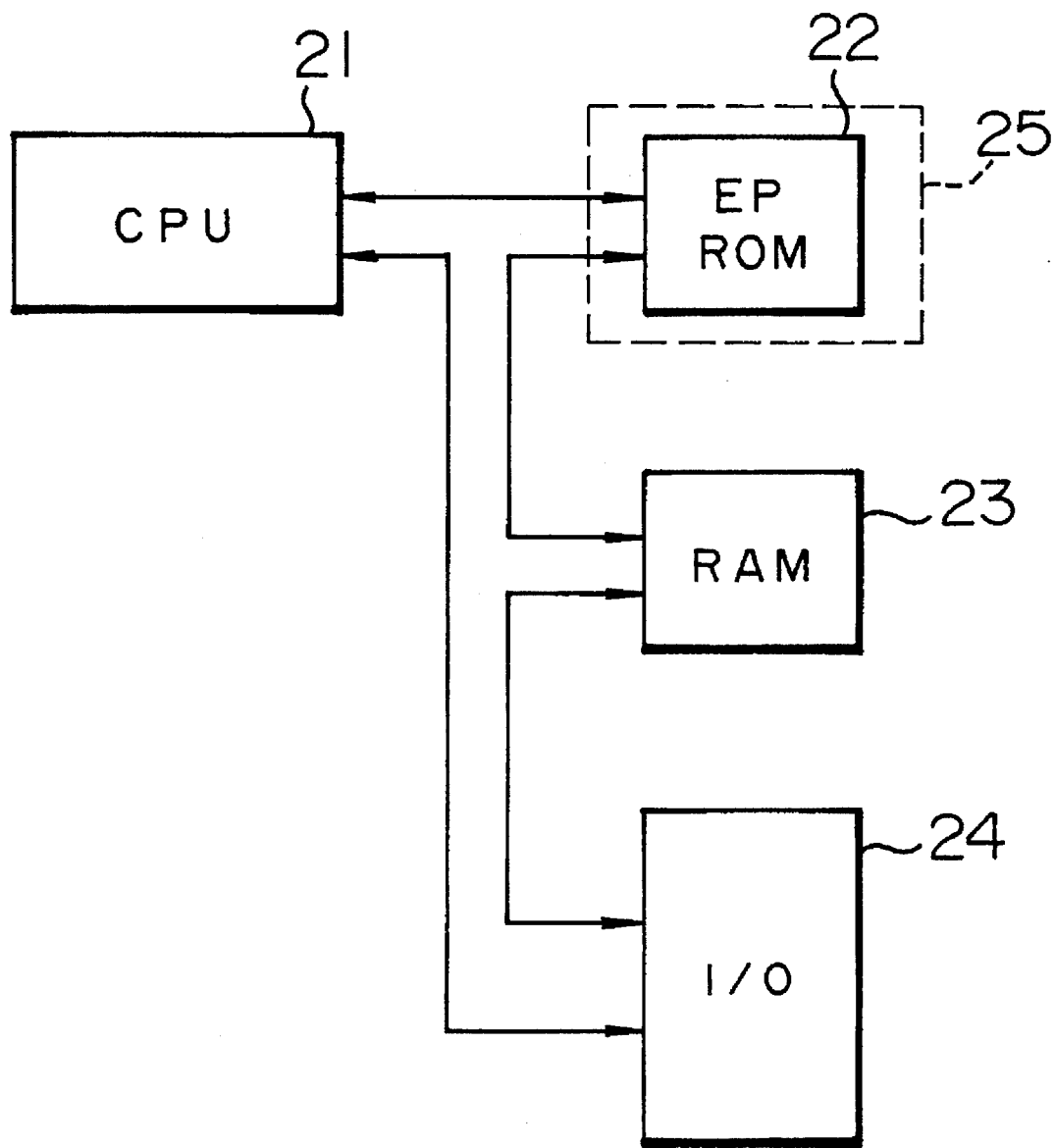
FIG. 4 is a schematic block diagram of a control system of a prior art car telephone apparatus.

In the present embodiment, a program (which will be referred to as the loader program, hereinafter) for control of the erasing and writing operation of the flash type EEPROM having the aforementioned function as well as a program for asynchronous serial interface communication are previously stored in the mask ROM 16 of the CPU 11. Therefore, it becomes unnecessary to write a program for control of the car telephone apparatus in the nonvolatile memory 12, so that, when a power supply is initially turned on, the loader program of the mask ROM 16 is first activated, whereby the CPU 11 can independently control a series of erasing and writing operations of the nonvolatile memory 12. When input and output of commands fro control of the writing operation of the nonvolatile memory 12 are executed externally of the car telephone apparatus through the asynchronous serial interface 15, the nonvolatile memory 12 can be rewritten without dismounting the nonvolatile memory 12 from the car telephone apparatus. Explanation will next be made as to a sequence of writing operations by referring to a flowchart of FIGS. 2 and 3.

1) Confirming the contents of the chip

When the power supply of the car telephone apparatus is turned on, this causes the software stored in the ROM 16 of the CPU 11 to be first activated (step S1).

As a result, the CPU 11 once reads out the contents of the nonvolatile memory 12 through a bus line of the CPU, collates by such collation means as sum check code (step S2) to inspect the presence or absence of data written in the nonvolatile memory 12 (step S3), and informs the inspector of its inspection result through the external serial interface 15.

2) Inputting a write command

When the CPU 11 confirms that the contents of the nonvolatile memory 12 is already written, the CPU immediately activates software held in the nonvolatile memory 12 (step S4) to judge whether or not the memory 12 received a write command from the serial interface 15 (step S5). When determining absence of the reception of the write command, the CPU starts its predetermined control operation.

When determining that the nonvolatile memory 12 is not written yet, the CPU 11 informs the inspector of its result through the external serial interface 15 (step S7) and gets ready for an input (step S8).

Even in the case where the contents of the nonvolatile memory 12 is already written, when it is desired to change the contents, the inspector externally informs the CPU 11 of a write request through the serial interface 15.

3) Transferring writing data

The inspector enters a command through the external serial interface 15 to activate the writing software of the CPU 11 and then transfers writing data, whereby the CPU 11, whenever receiving the writing data, sequentially temporarily stores the writing data in the RAM 13 (step S6).

4) Erasing the contents of the memory

The CPU 11 controls the switching transistor 17 through the I/O port 14 in such a manner that a high voltage necessary for the erasing program is applied from the transistor 17 to a predetermined terminal of the nonvolatile memory 12 (step S9), so that the CPU 11 inputs an erase command to the memory 12 through the bus line of the CPU 11 to execute the erasing operation of the memory 12 (step S10).

5) Writing the memory

In the similar manner to the above, the memory 12 is set in its write mode. The data temporarily stored in the RAM 13 are sequentially written into the memory 12 through a bus line under control the CPU 11 (step S11). When the writing operation is completed, the CPU 11 turns off the switching transistor 17 through the I/O port 14.

6) Collating the written contents

After rewriting the contents of the memory 12 by the aforementioned means, the CPU 11 reads out the contents of the nonvolatile memory 12 and externally informs the inspector of the read-out contents through the serial interface 15 (step S13).

The CPU 11 collates the external writing data with the read-out data (step S14) to judge coincidence or non-coincidence between these data (step S15). When determining the coincidence between these data, the CPU 11 finally writes into the chip 12 a sum check code and a flag indicative of the already written chip.

When determining the non-coincidence between the data, the CPU 11 again erases the contents of the memory 12 and repeats such subsequent operations as already explained above.

As will be clear from the foregoing embodiment, the present invention has the effect that the electrically erasable, nonvolatile memory in place of the conventional nonvolatile memory of the ultraviolet ray erase type is used and the writing means to the memory and the means for externally transferring the writing data thereto are also provided in the car telephone apparatus, whereby the rewriting operation of the program of the nonvolatile memory can be realized while the memory being mounted in the car telephone apparatus.

Further, since restrictions on mounting the memory in the car telephone apparatus can be eliminated, the car telephone apparatus can be correspondingly made smaller in size and thickness.

What is claimed is:

1. In a car telephone apparatus, a combination comprising:

a) an electrically erasable and programmable read only memory (EEPROM) for storing at least an operational control program which is used to control operation of the apparatus;

b) a central processing unit (CPU) for controlling operation of the apparatus by executing the operational control program stored in the EEPROM;

c) operational control program replacing means for controlling writing and erasing operations of the EEPROM:

1) to write into the EEPROM, when no operational control program is stored in the EEPROM, an operational control program transferred from an external source, and 2) to replace, when an operational control program is stored in the EEPROM, the operational control program with a new operational control program, without removing the EEPROM from the apparatus, in accordance with an operational control program writing command transferred from the external source;

d) activating means for first activating, when a power supply of the apparatus is turned on, the operational control program replacing means to inquire (1) whether or not any operational control program is stored in the EEPROM and (2) whether or not an operational control program writing command has been received from the external source;

e) means for executing the operational control program when (1) the operational control program is stored in the EEPROM and (2) no operational control program writing command has been received;

f) means for causing the operational control program replacing means to wait for any operational control program writing command to be transferred from the external source, when no operational control program is stored in the EEPROM; and g) means for causing the operational control program replacing means to write the new operational control program into the EEPROM, when the operational control program writing command has been transferred from the external source.

2. The combination of claim 1, wherein the operational control program replacing means includes:

a random access memory (RAM) for temporarily storing the new operational control program transferred from the external source and for outputting the new operational control program to the EEPROM; and operational control program transfer means for transferring the new operational control program from the external source to the RAM.

3. The combination of claim 2, further comprising:

checking means for checking (1) data of the new operational control program stored in the EEPROM with (2) data of the new operational control program stored in the RAM, after the new operational control program is written into the EEPROM.

4. The combination of claim 1, further comprising operating means including:

means for enabling the operational control program replacing means to be externally controlled; and means for outputting data of the new operational control program stored in the EEPROM to an external destination so as to enable the data to be checked externally.

\* \* \* \* \*